United States Patent
Kirk et al.

(10) Patent No.: US 10,936,567 B2
(45) Date of Patent: Mar. 2, 2021

(54) ACCELERATING QUERIES BASED ON ZONE CONDITION TALLIES

(71) Applicant: SAP SE, Walldorf (DE)

(72) Inventors: Steven Kirk, Chelmsford, MA (US); Roland McKenney, Billerica, MA (US)

(73) Assignee: SAP SE, Walldorf (DE)

(*) Notice: Subject to any disclaimer, the term of this patent is extended or adjusted under 35 U.S.C. 154(b) by 540 days.

(21) Appl. No.: 15/823,484

(22) Filed: Nov. 27, 2017

(65) Prior Publication Data

US 2019/0163771 A1    May 30, 2019

(51) Int. Cl.
*G06F 16/22* (2019.01)
*G06F 16/2453* (2019.01)
*G06F 16/2455* (2019.01)

(52) U.S. Cl.
CPC ........ *G06F 16/221* (2019.01); *G06F 16/2237* (2019.01); *G06F 16/2453* (2019.01); *G06F 16/2455* (2019.01)

(58) Field of Classification Search
CPC ............. G06F 16/221; G06F 16/2237; G06F 16/2453; G06F 16/2455; G06F 16/2282; G06F 16/24542
See application file for complete search history.

(56) References Cited

U.S. PATENT DOCUMENTS

| | | | |
|---|---|---|---|
| 2004/0225639 A1* | 11/2004 | Jakobsson | G06F 16/2462 |
| 2005/0256835 A1* | 11/2005 | Jenkins, Jr. | G06F 16/24542 |
| 2009/0171921 A1* | 7/2009 | Kirk | G06F 16/245 |
| 2017/0116278 A1* | 4/2017 | Baby | G06F 16/27 |

* cited by examiner

*Primary Examiner* — Robert W Beausoliel, Jr.
*Assistant Examiner* — Mohammad Solaiman Bhuyan
(74) *Attorney, Agent, or Firm* — Fountainhead Law Group P.C.

(57) ABSTRACT

Some embodiments provide a non-transitory machine-readable medium that stores a program. The program receives, from a requestor, a query for data comprising a condition on a column of a table. The table includes a plurality of records divided into a plurality of zones. The program further determines a set of zones in the plurality of zones that include records that satisfy the condition based on a plurality of tallies associated with the plurality of zones. Each tally in the plurality of tallies is for indicating whether a zone in the plurality of zones include records with data values in the column of the table that satisfy the condition. The program also determines a result set of records in the table that satisfy the condition based on records in the set of zones. The program further sends the result set of records to the requestor.

20 Claims, 10 Drawing Sheets

Zone Condition Tally for MONTH(T.BUY_DATE) = 9

| Zone ID | Satisfy Bit Tally |
|---|---|
| 1 | 0 |
| 2 | 1 |
| 3 | 1 |
| 4 | 1 |
| 5 | 0 |
| 6 | 0 |
| 7 | 0 |
| 8 | 0 |

205

Cell Values of T.BUY_DATE

| Zone ID | Cell Values |
|---|---|
| 1 | 2015/07/21, 2015/07/29, 2015/08/01 |
| 2 | 2015/08/05, 2015/08/11, 2015/08/23, 2015/08/25, 2015/09/02 |
| 3 | 2015/09/03, 2015/09/07, 2015/09/07, 2015/09/11, 2015/09/12, 2015/09/18 |
| 4 | 2015/09/22, 2015/09/29, 2015/10/13 |
| 5 | 2015/11/12, 2015/11/18, 2015/12/06, 2016/01/17 |
| 6 | 2016/01/28, 2016/01/29, 2016/02/02, 2016/02/11, 2016/02/17 |
| 7 | 2016/02/27, 2016/03/07, 2016/03/30, 2016/04/01, 2016/04/22, 2016/05/03 |
| 8 | 2016/05/08, 2016/05/16, 2016/06/07 |

210

Table T

| BUY_DATE | AMT_BILLED | AMT_RECEIVED |
|---|---|---|
| Zone 1 | | |
| Zone 2 | | |
| Zone 3 | | |
| Zone 4 | | |
| Zone 5 | | |
| Zone 6 | | |
| Zone 7 | | |
| Zone 8 | | |

Table T

| BUY_DATE | AMT_BILLED | AMT_RECEIVED |
|---|---|---|
| | Zone 1 | Zone 1 |
| | Zone 2 | Zone 2 |
| | Zone 3 | Zone 3 |
| | Zone 4 | Zone 4 |
| | Zone 5 | Zone 5 |
| | Zone 6 | Zone 6 |
| | Zone 7 | Zone 7 |
| | Zone 8 | Zone 8 |
| | | |

200

Zone Condition Tally for
(T.AMT_BILLED − T.AMT_RECEIVED) < 0

| Zone ID | Satisfy Bit Tally |
|---|---|
| 1 | 0 |
| 2 | 0 |
| 3 | 0 |
| 4 | 0 |
| 5 | 1 |
| 6 | 0 |
| 7 | 0 |
| 8 | 1 |

305

Cell Value Pairs
{T.AMT_BILLED, T.AMT_RECEIVED}

| Zone ID | Cell Values |
|---|---|
| 1 | {103, 103}, {27, 27}, {41, 41}, {36, 36}, {17, 17}, {61, 61} |
| 2 | {41, 41}, {20, 20}, {17, 17}, {15, 15}, {20, 20}, {27, 27}, {41, 41} |
| 3 | {36, 36}, {20, 20}, {15, 15}, {201, 201}, {80, 80} |
| 4 | {61, 61}, {103, 103}, {17, 17}, {15, 15}, {20, 20}, {41, 41}, {15, 15} |
| 5 | {13, 13}, {10, 12}, {33, 28}, {78, 81}, {12, 9}, {25, 20} |
| 6 | {20, 7}, {35, 25}, {67, 44}, {58, 39}, {99, 77}, {43, 38} |
| 7 | {27, 27}, {41, 0}, {36, 36}, {17, 17}, {36, 0}, {61, 61} |
| 8 | {36, 36}, {20, 20}, {20, 61}, {36, 0}, {15, 15}, {41, 41}, {20, 20} |

Zone Condition Tally for MONTH(T.BUY_DATE) = 9

| Zone ID | Satisfy Bit Tally | Fail to Satisfy Bit Tally |
|---|---|---|
| 1 | 0 | 1 |
| 2 | 1 | 1 |
| 3 | 1 | 0 |
| 4 | 1 | 1 |
| 5 | 0 | 1 |
| 6 | 0 | 1 |
| 7 | 0 | 1 |
| 8 | 0 | 1 |

405

Cell Values of T.BUY_DATE

| Zone ID | Cell Values |
|---|---|
| 1 | 2015/07/21, 2015/07/29, 2015/08/01 |
| 2 | 2015/08/05, 2015/08/11, 2015/08/23, 2015/08/25, 2015/09/02 |
| 3 | 2015/09/03, 2015/09/07, 2015/09/11, 2015/09/12, 2015/09/18 |
| 4 | 2015/09/22, 2015/09/29, 2015/10/13 |
| 5 | 2015/11/12, 2015/11/18, 2015/12/06, 2016/01/17 |
| 6 | 2016/01/28, 2016/01/29, 2016/02/02, 2016/02/11, 2016/02/17 |
| 7 | 2016/02/27, 2016/03/07, 2016/03/30, 2016/04/01, 2016/04/22, 2016/05/03 |
| 8 | 2016/05/08, 2016/05/16, 2016/06/07 |

210

Table T

| BUY_DATE | AMT_BILLED | AMT_RECEIVED |
|---|---|---|
| Zone 1 | | |
| Zone 2 | | |
| Zone 3 | | |
| Zone 4 | | |
| Zone 5 | | |
| Zone 6 | | |
| Zone 7 | | |
| Zone 8 | | |

Table T (200)

| BUY_DATE | AMT_BILLED | AMT_RECEIVED |
|---|---|---|
| | Zone 1 | Zone 1 |
| | Zone 2 | Zone 2 |
| | Zone 3 | Zone 3 |
| | Zone 4 | Zone 4 |
| | Zone 5 | Zone 5 |
| | Zone 6 | Zone 6 |
| | Zone 7 | Zone 7 |
| | Zone 8 | Zone 8 |
| | | |

Zone Condition Tally for (T.AMT_BILLED – T.AMT_RECEIVED) < 0 (505)

| Zone ID | Satisfy Count Tally | Cell Count Tally |
|---|---|---|
| 1 | 0 | 6 |
| 2 | 0 | 7 |
| 3 | 0 | 5 |
| 4 | 0 | 7 |
| 5 | 2 | 6 |
| 6 | 0 | 6 |
| 7 | 0 | 6 |
| 8 | 1 | 7 |

Cell Value Pairs {T.AMT_BILLED, T.AMT_RECEIVED} (310)

| Zone ID | Cell Values |
|---|---|
| 1 | {103, 103}, {27, 27}, {41, 41}, {36, 36}, {17, 17}, {61, 61} |
| 2 | {41, 41}, {20, 20}, {17, 17}, {15, 15}, {20, 20}, {27, 27}, {41, 41} |
| 3 | {36, 36}, {20, 20}, {15, 15}, {201, 201}, {80, 80} |
| 4 | {61, 61}, {103, 103}, {17, 17}, {15, 15}, {20, 20}, {41, 41}, {15, 15} |
| 5 | {13, 13}, {10, 12}, {33, 28}, {78, 81}, {12, 9}, {25, 20} |
| 6 | {20, 7}, {35, 25}, {67, 44}, {58, 39}, {99, 77}, {43, 38} |
| 7 | {27, 27}, {41, 0}, {36, 36}, {17, 17}, {36, 0}, {61, 61} |
| 8 | {36, 36}, {20, 20}, {20, 61}, {36, 0}, {15, 15}, {41, 41}, {20, 20} |

FIG. 5

ACCELERATING QUERIES BASED ON ZONE CONDITION TALLIES

BACKGROUND

Database systems are typically used to manage and store data. In many cases, queries may be made against the data managed and stored by such systems. Often times, a query for data specifies one or more tables and a set of conditions. When a database system receives such a query, the database system identifies records in the one or more tables that satisfy the set of conditions. The database system then returns the identified records (e.g., a result set of the query) to the requestor of the query. Different database systems may employ different techniques for processing queries that have different impacts on the speed at which the queries are processed.

SUMMARY

In some embodiments, a non-transitory machine-readable medium stores a program. The program receives, from a requestor, a query for data comprising a condition on a column of a table. The table includes a plurality of records divided into a plurality of zones. The program further determines a set of zones in the plurality of zones that include records that satisfy the condition based on a plurality of tallies associated with the plurality of zones. Each tally in the plurality of tallies is for indicating whether a zone in the plurality of zones include records with data values in the column of the table that satisfy the condition. The program also determines a result set of records in the table that satisfy the condition based on records in the set of zones. The program further sends the result set of records to the requestor.

In some embodiments, the plurality of tallies may be a first plurality of tallies. Determining the set of zones in the plurality of zones that include records that satisfy the condition may be further based on a second plurality of tallies associated with the plurality of zones. Each tally in the second plurality of tallies may be for indicating whether any of the records in a zone in the plurality of zones include records with data values in the column of the table that fail to satisfy the condition. The plurality of tallies may be a plurality of bit tallies. The plurality of bit tallies may be a first plurality of bit tallies. Determining the set of zones in the plurality of zones that include records that satisfy the condition may be further based on a second plurality of bit tallies associated with the plurality of zones. Each bit tally in the second plurality of bit tallies may be for indicating whether any of the records in a zone in the plurality of zones have data values in the column of the table that fail to satisfy the condition.

In some embodiments, the plurality of tallies is a plurality of count tallies. The plurality of count tallies may be a first plurality of count tallies. Determining the set of zones in the plurality of zones that include records that satisfy the condition may be further based on a second plurality of count tallies associated with the plurality of zones. Each count tally in the second plurality of count tallies may be for indicating a number of records in a zone in the plurality of zones that fail to satisfy the condition. The plurality of count tallies may be a first plurality of count tallies. Determining the set of zones in the plurality of zones that include records that satisfy the condition may be further based on a second plurality of count tallies associated with the plurality of zones, each count tally in the second plurality of count tallies for indicating a total number of records in a zone in the plurality of zones.

In some embodiments, a method receives, from a requestor, a query for data comprising a condition on a column of a table. The table includes a plurality of records divided into a plurality of zones. The method further determines a set of zones in the plurality of zones that include records that satisfy the condition based on a plurality of tallies associated with the plurality of zones. Each tally in the plurality of tallies is for indicating whether a zone in the plurality of zones include records with data values in the column of the table that satisfy the condition. The method also determines a result set of records in the table that satisfy the condition based on records in the set of zones. The method further sends the result set of records to the requestor.

In some embodiments, the plurality of tallies may be a first plurality of tallies. Determining the set of zones in the plurality of zones that include records that satisfy the condition may be further based on a second plurality of tallies associated with the plurality of zones. Each tally in the second plurality of tallies may be for indicating whether any of the records in a zone in the plurality of zones include records with data values in the column of the table that fail to satisfy the condition. The plurality of tallies may be a plurality of bit tallies. The plurality of bit tallies may be a first plurality of bit tallies. Determining the set of zones in the plurality of zones that include records that satisfy the condition may be further based on a second plurality of bit tallies associated with the plurality of zones. Each bit tally in the second plurality of bit tallies may be for indicating whether any of the records in a zone in the plurality of zones have data values in the column of the table that fail to satisfy the condition.

In some embodiments, the plurality of tallies may be a plurality of count tallies. The plurality of count tallies may be a first plurality of count tallies. Determining the set of zones in the plurality of zones that include records that satisfy the condition may be further based on a second plurality of count tallies associated with the plurality of zones. Each count tally in the second plurality of count tallies may be for indicating a number of records in a zone in the plurality of zones that fail to satisfy the condition. The plurality of count tallies may be a first plurality of count tallies. Determining the set of zones in the plurality of zones that include records that satisfy the condition may be further based on a second plurality of count tallies associated with the plurality of zones. Each count tally in the second plurality of count tallies may be for indicating a total number of records in a zone in the plurality of zones.

In some embodiments, a system includes a set of processing units and a non-transitory computer-readable medium that stores instructions. The instructions cause at least one processing unit to receive, from a requestor, a query for data comprising a condition on a column of a table. The table includes a plurality of records divided into a plurality of zones. The instructions further cause the at least one processing unit to determine a set of zones in the plurality of zones that include records that satisfy the condition based on a plurality of tallies associated with the plurality of zones. Each tally in the plurality of tallies is for indicating whether a zone in the plurality of zones include records with data values in the column of the table that satisfy the condition. The instructions also cause the at least one processing unit to determine a result set of records in the table that satisfy the condition based on records in the set of zones. The instructions further cause the at least one processing unit to send the result set of records to the requestor.

In some embodiments, the plurality of tallies may be a first plurality of tallies. Determining the set of zones in the plurality of zones that include records that satisfy the condition may be further based on a second plurality of tallies associated with the plurality of zones. Each tally in the second plurality of tallies may be for indicating whether any of the records in a zone in the plurality of zones include records with data values in the column of the table that fail to satisfy the condition. The plurality of tallies may be a plurality of bit tallies. The plurality of bit tallies may be a first plurality of bit tallies. Determining the set of zones in the plurality of zones that include records that satisfy the condition may be further based on a second plurality of bit tallies associated with the plurality of zones. Each bit tally in the second plurality of bit tallies may be for indicating whether any of the records in a zone in the plurality of zones have data values in the column of the table that fail to satisfy the condition.

In some embodiments, the plurality of tallies may be a plurality of count tallies. The plurality of count tallies may be a first plurality of count tallies. Determining the set of zones in the plurality of zones that include records that satisfy the condition may be further based on a second plurality of count tallies associated with the plurality of zones. Each count tally in the second plurality of count tallies may be for indicating a number of records in a zone in the plurality of zones that fail to satisfy the condition.

The following detailed description and accompanying drawings provide a better understanding of the nature and advantages of the present invention.

BRIEF DESCRIPTION OF THE DRAWINGS

FIG. 2 illustrates an example zone condition tally that includes a bit tally according to some embodiments.

FIG. 3 illustrates another example zone condition tally that includes a bit tally according to some embodiments.

FIG. 4 illustrates an example zone condition tally that includes several bit tallies according to some embodiments.

FIG. 5 illustrates an example zone condition tally that includes count tallies according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing a system that processes queries for data based on zone condition tallies. In some embodiments, the system defines a zone condition tally that specifies a condition on one or more columns in a table of records. The table of records may be divided into a plurality of disjoint subsets of column record values (also referred to as zones) where each column record belongs to one and only one zone. The zone condition tally may include, for each of the different zones, metadata that indicates whether the zone includes at least one record having values that satisfy the condition specified by the zone condition tally. When the system receives a query from an application or user that includes a condition specified by a zone condition tally, the system may use the zone condition tally to include zones that include data that may satisfy the condition in a query plan for the query and exclude zones that do not include data that satisfy the condition from the query plan for the query. In this manner, the zone condition tally may allow queries to run faster because large portions of a table can be ignored during query processing. Based on the query plan for the query, the system determines the records in the table to return to the application or the user.

Figure 1:
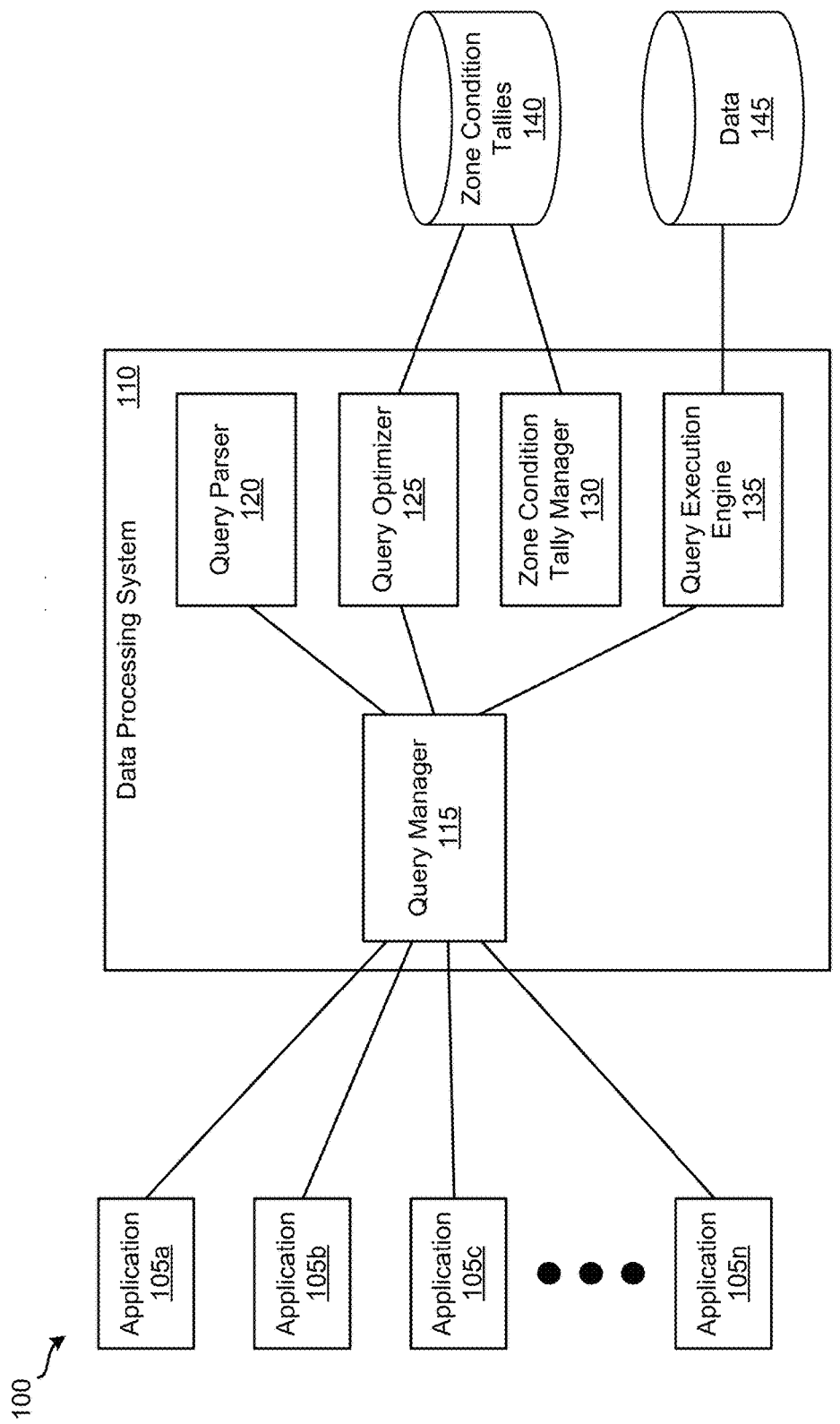
FIG. 1 illustrates a system according to some embodiments.

FIG. 1 illustrates a system 100 according to some embodiments. As shown, system includes applications 105a-n, data processing system 110, and storages 140 and 145. Applications 105a-n are software applications/programs that each includes instructions for performing a set of tasks when executed by a computing device (e.g., a desktop computer, a server computer, a laptop, a tablet, a mobile computing device, etc.). For instance, applications 105a-n may be configured to communicate with and request data stored in data storage 145 from data processing system 110 (e.g., by sending data processing system 110 queries for data). In addition, applications 105a-n can send data to data processing system 110 and request the data to be added to data storage 145. Also, applications 105a-n may send data processing system 110 requests to remove data from data storage 145. In some embodiments, one or more applications 105a-n may operate on a computing device separate from a computing device on which data processing system 110 operates. In other embodiments, one or more applications 105a-n may operate on the same computing device on which data processing system 110 operates.

Zone condition tallies storage 140 is configured to store zone condition tallies. Data storage 145 is configured to store various data that may be requested by applications 105a-n. Storages 140 and 145 may be relational databases, non-relational databases, or a combination thereof. In some embodiments, storages 140 and 145 are implemented in a single physical storage while, in other embodiments, storages 140 and 145 may be implemented across several physical storages. In other embodiments, storage 140 may be implemented in memory and not persistently stored in physical storage. While FIG. 1 shows storages 140 and 145 as external to system 110, one of ordinary skill in the art will appreciate that storages 140 and/or 145 may be part of system 110 in some embodiments.

Data processing system 110 is configured to process queries received from applications 105a-n for data in data storage 140. As illustrated in FIG. 1, data processing system 110 includes query manager 115, query parser 120, query optimizer 125, zone condition tally manager 130, and query execution engine 135. Query manager 115 is responsible for managing the processing of queries received from applications 105a-n. For example, when query manager 115 receives a query from an application 105, query manager 115 forwards the query to query parser 120 for parsing. Once query manager 115 receives the parsed query from query parser, query manager 115 sends the parsed query to query optimizer 125 for processing. In return, query manager 115 receives a query plan from query optimizer 125. Query manager 115 then sends the query plan to query execution engine 135 for execution. Finally, query manager 115 receives a result set for the query from query execution engine 135 and forwards the result set for the query to the application 105.

Query parser 120 is configured to parse queries received from query manager 115. For example, when query parser 120 receives a query from query manager 115, query parser 120 may check the query string for syntactic correctness. Query parser 120 can also check the query string for semantic correctness. After parsing the query string, query parser 120 sends the parsed query to query manager 115.

Query optimizer 125 handles the planning and optimizing of the execution of queries. For instance, upon receiving a parsed query from query manager 115, query optimizer 125 generates a query plan for executing the query. In some embodiments, a query plan for a query is a set of operations that when executed retrieves data (e.g., a result set) for the query. Once query optimizer 125 has generated the query plan for the query, query optimizer 125 sends the completed query plan to query manager 115.

In some embodiments, query optimizer 125 may use zone condition tallies for determining whether to include or exclude records for a query. Zone condition tallies may be defined for conditions associated with the zone map on one or more columns from a table of records, where the table is divided into a set of zones such that each column cell value belongs to exactly one zone. The condition associated with the zone map is also known as the zone condition or the mapped condition. A zone condition tally may include, for each zone, metadata that indicates whether the zone includes rows that satisfy the condition for which the zone condition tally is defined. One of ordinary skill in the art will understand that different zone condition tallies may be defined on different columns of a table and/or different zone condition tallies may be defined on a single column of table.

In some embodiments, zone condition tallies are defined for commonly used conditions that fall into one of several categories. A first category of conditions may include conditions that are highly selective (e.g., a condition where a large number of rows fail to satisfy the condition). A second category of conditions may include conditions that are highly non-selective (e.g., a condition where a large number of rows satisfy the condition). A third category of conditions may include conditions where the result of the condition is highly correlated with time of insertion (e.g., the condition specified for the zone condition tally described below by reference to FIG. 2).

Information associated with each zone may include the column cell values that belong to the zone and the set of rows that correspond to the zone. In some embodiments, such zone information is stored within each zone condition tally. In other embodiments, such zone information is stored separately from the zone condition tally (e.g., in data storage 145) with the advantage that the zone information can then be shared among multiple zone condition tallies over different mapped conditions. For disk-based databases, each zone may be stored separately from zone condition tallies and may correspond to all the table data stored within a set of disk pages. This way, reading data for a zone condition tally stored in zone condition tallies storage 140 avoids reading any columns for rows from disqualified zones stored in data storage 145. For a row-oriented database, each zone may correspond to the set of all rows stored in one set of disk pages. For a column-oriented database, each zone may correspond to the set of all column cell values for a specific column stored in one set of disk pages.

FIG. 2 illustrates an example zone condition tally that includes a bit tally according to some embodiments. Specifically, FIG. 2 illustrates table 200, zone condition tally 205 for a mapped condition, and cell values 210 from table 200. As shown, table 200 (Table T) includes 3 columns: column BUY_DATE, column AMT_BILLED, and column AMT_RECEIVED. In this example, column BUY_DATE of table 200 is divided into Zones 1-8. Each of the Zones 1-8 includes one or more values in column BUY_DATE of table 200 and each of the Zones 1-8 corresponds to a specific set of rows from table 200 (not shown). For this example, cell values 210 include date values in the form of year/month/day (e.g., YYYY/MM/DD) that are stored in column BUY_DATE of the rows in each of the Zones 1-8.

In this example, zone condition tally 205 is defined for a condition in which the month number of a date value stored in column BUY_DATE of table 200 is equal to 9 (e.g., MONTH(T.BUY_DATE)=9). As illustrated, zone condition tally 205 includes a mapping between Zones 1-8 of column BUY_DATE in table 200 and metadata associated with Zones 1-8. In particular, each of the Zones 1-8 (represented by a corresponding zone identifier (ID)) is associated with a bit tally (also referred to as a satisfy bit tally) that indicates whether there are any rows in the zone that satisfy the condition defined for zone condition tally 205. In this example, a bit value of 1 (e.g., a bit that is set, a bit that is on, etc.) indicates that the zone associated with the bit tally includes rows that satisfy the condition defined for zone condition tally 205 while a bit value of 0 (e.g., a bit that is not set, a bit that is off, etc.) indicates that the zone associated with the bit tally does not include any rows that satisfy the condition defined for zone condition tally 205. As shown, the bit tallies for Zones 1 and 5-8 is 0 since these zones do not include any rows with cell values in column BUY_DATE that satisfy the condition MONTH(T.BUY_DATE)=9. The bit tallies for Zones 2-4 is 1 since these zones include rows with cell values in column BUY_DATE that satisfy the condition MONTH(T.BUY_DATE)=9.

Returning to FIG. 1, when query optimizer 125 receives a query that includes a condition on one or more columns of a table, query optimizer 125 determines whether a zone condition tally can be used to accelerate the execution of the query. In some embodiments, query optimizer 125 determines that a zone condition tally can be used to accelerate the execution of the query if the condition of the query is the same as the mapped condition of the zone condition tally, the condition of the query can be rewritten into the mapped condition of the zone condition tally, the condition of the query is a negation of the mapped condition of the zone condition tally, or the condition of the query can be rewritten into the negation of the mapped condition of the zone condition tally. Referring to FIG. 2 as an example, query optimizer 125 may determine that zone condition tally can be used to accelerate the execution of a query that includes the condition MONTH(T.BUY_DATE)=9 since the condition of the query is the same as the mapped condition of zone condition tally 205 or a query that includes the condition NOT MONTH(T.BUY_DATE)=9 since the condition of the query is a negation of the mapped condition of the zone condition tally. In some embodiments, query optimizer 125 may rewrite conditions of queries into a mapped condition for a zone condition tally. For instance, a query may include a condition of MONTHNAME(T.BUY_DATE)='September', which is a condition where the name associated with the month number of a date value stored in column BUY_DATE of table 200 is equal to 'September'. In some such embodiments, query optimizer 125 can rewrite the condition of the query to be MONTH(T.BUY_DATE)=9. In some embodiments, query optimizer 125 may rewrite conditions of queries into a negation of a mapped condition for a zone condition tally. For example, a query may include a condition of MONTHNAME(T.BUY_DATE)< >'September', which is a condition where the name associated with the month number of a date value stored in column BUY_DATE of table 200 is equal to 'September'. In some such embodiments, query optimizer 125 can rewrite the condition of the query to be NOT MONTH(T.BUY_DATE)=9.

In some embodiments, query optimizer 125 can identify a zone that may contain column values that can satisfy the condition of one of the aforementioned types of queries (also referred to as a qualified zone) by examining the bit tallies in zone condition tally 205. If the bit tally associated with a zone is on, query optimizer 125 determines to include the zone in a query plan for the query. If the bit tally associated with a zone is off, query optimizer 125 determines to exclude the zone from the query plan for the query. By including zones of values in, and excluding zones of values from, a query plan for the query, the amount of values in the column that are read from disk for a disk-based database can be reduced, thereby improving the speed at which the query is executed. Similarly, for any kind of database, the number of values in the column over which the condition of the query is evaluated is reduced, thereby further improving the speed at which the query is executed. While the identification of qualified and disqualified zones is described as being implemented by query optimizer 125, one of ordinary skill in the art will appreciated that the identification of qualified and disqualified zones may be implemented by a different component (e.g., query execution engine 135) in some embodiments.

In some embodiments, zone condition tallies may be defined for a condition on several columns of a table. FIG. 3 illustrates an example of such a zone condition tally according to some embodiments. In particular, FIG. 3 illustrates table 200, zone condition tally 305, and cell value pairs 310 in tables 200. For this example, columns AMT_BILLED and AMT_RECEIVED of table 200 are divided into Zones 1-8 8 such that each column cell value belongs to only one zone and that the AMT_BILLED and AMT_RECEIVED cell values from any specific row in the table 200 belong to the same zone. Each of the Zones 1-8 includes values of one or more records of table 200 (not shown). For this example, cell values 310 include values stored in columns AMT_BILLED and AMT_RECEIVED of the rows in each of the Zones 1-8.

In this example, zone condition tally 305 is defined for a condition of the difference between values on columns AMT_BILLED and AMT_RECEIVED of table 200 being less than zero (e.g., (T.AMT_BILLED−T.AMT_RECEIVED)<0). As illustrated, zone condition tally 305 includes a mapping between Zones 1-8 of columns AMT_BILLED and AMT_RECEIVED in table 200 and metadata associated with Zones 1-8. Specifically, each of the Zones 1-8 (represented by a corresponding zone identifier (ID)) is associated with a satisfy bit tally that indicates whether there are any rows in the zone that satisfy the condition defined for zone condition tally 305. In this example, a bit value of 1 (e.g., a bit that is set, a bit that is on, etc.) indicates that the zone associated with the bit tally includes rows that satisfy the condition defined for zone condition tally 305 while a bit value of 0 (e.g., a bit that is not set, a bit that is off, etc.) indicates that the zone associated with the bit tally does not include any rows that satisfy the condition defined for zone condition tally 305. As illustrated, the bit tallies for Zones 1-4, 6, and 7 is 0 since these zones do not include any rows with cell values in columns AMT_BILLED and AMT_RECEIVED that satisfy the condition (T.AMT_BILLED−T.AMT_RECEIVED)<0. The bit tallies for Zones 5 and 8 is 1 since these zones include rows with cell values in columns AMT_BILLED and AMT_RECEIVED that satisfy the condition (T.AMT_BILLED−T.AMT_RECEIVED)<0.

FIGS. 2 and 3 illustrate examples of a zone condition tally that uses a single bit tally to indicate whether a particular zone includes any rows that satisfy a condition defined for the zone condition tally. In some embodiments, a zone condition tally may employ additional bit tallies to describe the data in the columns of rows in the different zones. FIG. 4 illustrates an example zone condition tally that includes several bit tallies according to some embodiments. Specifically, FIG. 4 is similar to FIG. 2 except FIG. 4 includes zone condition tally 405 instead of zone condition tally 205. For this example, zone condition tally 405 is defined for a condition in which the month number of a date value stored in column BUY_DATE of table 200 is equal to 9 (e.g., MONTH(T.BUY_DATE)=9). As illustrated, zone condition tally 405 includes a mapping between Zones 1-8 of column BUY_DATE in table 200 and metadata associated with Zones 1-8. In particular, each of the Zones 1-8 (represented by a corresponding zone identifier (ID)) is associated with two bit tallies: a satisfy bit tally that indicates whether there are any rows in the zone that satisfy the condition defined for zone condition tally 405 and a fail-to-satisfy bit tally that indicates whether there are any rows in the zone that fail to satisfy the condition defined for the zone condition tally 405. In this example, a bit value of 1 (e.g., a bit that is set, a bit that is on, etc.) for the satisfy bit tally indicates that the zone associated with the bit tally includes rows that satisfy the condition defined for zone condition tally 405 while a bit value of 0 (e.g., a bit that is not set, a bit that is off, etc.) for the satisfy bit tally indicates that the zone associated with the bit tally does not include any rows that satisfy the condition defined for zone condition tally 405. In addition, a bit value of 1 (e.g., a bit that is set, a bit that is on, etc.) for the fail-to-satisfy bit tally indicates that the zone associated with the bit tally includes rows that fail to satisfy the condition defined for zone condition tally 405 while a bit value of 0 (e.g., a bit that is not set, a bit that is off, etc.) for the fail-to-satisfy bit tally indicates that the zone associated with the bit tally does not include any rows that fail to satisfy the condition defined for zone condition tally 405.

As shown in FIG. 4, the satisfy bit tallies for Zones 1 and 5-8 is 0 since these zones do not include any rows with cell values in column BUY_DATE that satisfy the condition MONTH(T.BUY_DATE)=9. The satisfy bit tallies for Zones 2-4 is 1 since these zones include rows with cell values in column BUY_DATE that satisfy the condition MONTH(T.BUY_DATE)=9. The fail-to-satisfy bit tallies for Zone 3 is 0 because this zone does not include any rows with cell values in column BUY_DATE that fail to satisfy the condition MONTH(T.BUY_DATE)=9. Lastly, the fail-to-satisfy bit tallies for Zones 1, 2, and 4-8 is 1 because these zones include rows with cell values in column BUY_DATE that fail to satisfy the condition MONTH(T.BUY_DATE)=9.

As mentioned above, a qualified zone is a zone that may contain column values that can satisfy the condition of a query. Returning to FIG. 1, query optimizer 125 may further classify qualified zones into different types of qualified zones in some embodiments. For example, query optimizer 125, in some such embodiments, may classify a qualified zone in which all the rows in the zone satisfy the condition of the query as a guaranteed zone and a qualified zone in which some but not all of the rows in the zone satisfy the condition of the query as a border zone. In some embodiments, query optimizer 125 classifies qualified zones in such a manner for zone condition tallies that employ a satisfy bit tally and a fail-to-satisfy bit tally. Referring to FIG. 4 as an example, query optimizer 125 may identify a qualified zone as a guaranteed zone when the satisfy bit is set and the fail-to-satisfy bit is not set. As such, query optimizer 125 identifies qualified zone 3 as a guaranteed zone. Continuing with the example, query optimizer 125 can identify a qualified zone as a border zone when both the satisfy bit and the fail-to-satisfy bit are set. Thus, query optimizer 125 identifies qualifies zones 2 and 4 as border zones. In this example, query optimizer 125 identifies zones 1 and 5-8 as disqualified zones since the satisfy bit tally for these zones is 0, which indicates that these zones do not include any rows that satisfy the mapped condition.

As explained above, a zone condition tally can be used to accelerate a query that includes the negation of a mapped condition specified for a zone condition tally. Referring to FIG. 4 as an example, query optimizer 125 may receive a query that includes a condition of MONTH(T.BUY_DATE) !=9. In this example, query optimizer 125 identifies the guaranteed zones based on zone condition tally 405 and determines that the identified guaranteed zones are disqualified zones for the query. Thus, query optimizer 125 determines that Zone 3 is a disqualified zone and excludes this zone from a query plan for the query. Query optimizer 125 then identifies the disqualified zones based on zone condition tally 405 and determines that the identified disqualified zones are guaranteed zones for the query. As such, query optimizer 125 determines that Zones 1 and 5-8 are guaranteed zones and includes these zones in the query plan for the query as guaranteed zones. Query optimizer 125 treats border zones the same in this example. Thus, query optimizer 125 identifies Zones 2 and 4 as border zones and includes these zones in the query plan for the query as border zones.

As described above, a zone condition tally may be used to accelerate a query that includes a condition that can be rewritten to be the same as a mapped condition specified for a zone condition tally. Referring to FIG. 2 as an example, query optimizer 125 may receive a query that includes a condition of MONTH(T.BUY_DATE)=(4+5), a condition of MONTH(T.BUY_DATE)−1=8, etc. Query optimizer 125 determines that any of the aforementioned conditions of the query can be rewritten using normal algebraic rewrite rules into the condition "MONTH(T.BUY_DATE)=9. Based on zone condition tally 205, query optimizer 125 determines that Zones 1 and 5-8 are disqualified zones and excludes these zones from a query plan for the query. Additionally, query optimizer 125 determines that Zones 2-4 are qualified zones and includes these zones in the query plan for the query. In instances where zone condition tally 405 is utilized, query optimizer 125 may further classify the qualified zones into guaranteed zones and/or border zones in the same manner explained above.

FIGS. 2-4 illustrate various examples of bit tallies. One of ordinary skill in the art will appreciate that zone condition tallies may be defined with different types of bit tallies in some embodiments. For instance, a zone condition tally may be defined with only a fail-to-satisfy bit tally that indicates whether a zone includes rows that fail the mapped condition specified for the zone condition tally. Query optimizer 125 may use such a zone condition tally to identify zones that are guaranteed zones but not zones that are disqualified zones. As another example, z zone condition tally can be defined with a satisfy bit tally that indicates whether a zone includes any rows that satisfy the mapped condition specified for the zone condition tally and another bit tally used to identify guaranteed zones where all the rows in such zones satisfy the mapped condition specified for the zone condition tally. Furthermore, the example bit tallies described above by reference to FIGS. 2-4 utilize a bit value of 1 to represent true and a bit value of 0 to represent false. One of ordinary skill in the art will realize that bit tallies may use a bit value of 0 to represent true and a bit value of 1 to represent false in some embodiments.

The examples and embodiments explained above describe zone condition tallies defined with bit tallies. In some embodiments, zone condition tallies may be defined with count tallies. FIG. 5 illustrates an example zone condition tally that includes count tallies according to some embodiments. In particular, FIG. 5 is similar to FIG. 3 except FIG. 5 includes zone condition tally 505 instead of zone condition tally 305. In this example, zone condition tally 505 is defined for a condition of the difference between values on columns AMT_BILLED and AMT_RECEIVED of table 200 being less than zero (e.g., (T.AMT_BILLED−T.AMT_RECEIVED)<0). As illustrated, zone condition tally 505 includes a mapping between Zones 1-8 of columns AMT_BILLED and AMT_RECEIVED in table 200 and metadata associated with Zones 1-8. Specifically, each of the Zones 1-8 (represented by a corresponding zone identifier (ID)) is associated with a satisfy count tally that specifies a number of rows in the zone that satisfy the condition defined for zone condition tally 505 and a cell count tally that specifies a total number of rows in the zone.

As shown in FIG. 5, the satisfy count tallies for Zones 1-4, 6, and 7 is 0 since these zones do not include any rows with cell values in columns AMT_BILLED and AMT_RECEIVED that satisfy the condition (T.AMT_BILLED−T.AMT_RECEIVED)<0. The satisfy count tally for Zone 8 is 1 since this zone includes one row with cell values in columns AMT_BILLED and AMT_RECEIVED that satisfy the condition (T.AMT_BILLED−T.AMT_RECEIVED)<0. The satisfy count tally for Zone 5 is 2 since this zone includes two rows with cell values in columns AMT_BILLED and AMT_RECEIVED that satisfy the condition (T.AMT_BILLED−T.AMT_RECEIVED)<0. The cell count tally for Zone 3 is 5 since this zone includes five total rows. The cell count tally for Zones 1 and 5-7 is 5 since these zones each includes six total rows. The cell count tally for Zones 2, 4, and 8 is 5 since these zones each includes seven total rows.

Returning to FIG. 1, query optimizer 125 may use a zone condition tally defined with count tallies to identify disqualified zones, guaranteed zones, and border zones. Referring to FIG. 5 as an example, query optimizer 125 can use zone condition tally 505 to classify Zones 1-8. If the value of the satisfy count tally for a zone is zero, query optimizer 125 classifies the zone as a disqualified zone. If the value of the satisfy count tally for a zone is equal to the value of the cell count tally for the zone, query optimizer 125 classifies the zone as a guaranteed zone. If the value of the satisfy count tally for a zone is greater than zero and is less than the value of the cell count tally for the zone, query optimizer 125 classifies the zone as a border zone. In this example, query optimizer 125 classifies Zones 1-4, 6, and 7 as disqualified zones because the satisfy count tally for these zones is zero. Query optimizer 125 classifies Zones 5 and 8 as border zones because the value of the satisfy count tallies for these zones are greater than zero and are less than the value of the corresponding cell count tallies for these zones. Query optimizer 125 does not classify any zones as guaranteed zones since there are no zones that have a satisfy count tally equal to the cell count tally.

FIG. 5 illustrates an example of a zone condition tally defined with a satisfy count tally that specifies a number of rows in a particular zone that satisfy the condition defined for the zone condition tally and a cell count tally that specifies a total number of rows in the particular zone. Different zone condition tallies may be defined with different count tallies in different embodiments. For instance, in some embodiments where the zone infrastructure can inexpensively supply the total number of cells in zones, query optimizer 125 may use a zone condition tally that is defined with just a satisfy count tally that specifies a number of rows in a zone that satisfy the condition defined for the zone condition tally or just a fail to satisfy count tally that specifies a number of rows in the zone that fail to satisfy the condition defined for the zone condition tally along with the total number of cells in zones provided by the zone infrastructure in order to classify zones as disqualified zones, guaranteed zones, and border zones. In some embodiments where the zone infrastructure cannot inexpensively supply the total number of cells in zones, query optimizer 125 can still use the former zone condition tally (e.g., a zone condition tally defined with only a satisfy count tally that specifies a number of rows in a zone that satisfy the condition defined for the zone condition tally) to classify zones. However, query optimizer 125 may classify zones just as qualified ones or disqualified zones.

In some embodiments where the zone infrastructure cannot inexpensively supply the total number of cells in zones, query optimizer 125 may use one of the following zone condition tallies to classify zones as disqualified zones, guaranteed zones, and border zones: a zone condition tally defined with a satisfy count tally that specifies a number of rows in a zone that satisfy the condition defined for the zone condition tally and a fail to satisfy count tally that specifies a number of rows in the zone that fail to satisfy the condition defined for the zone condition tally; a zone condition tally (e.g., zone condition tally 505) defined with a satisfy count tally that specifies a number of rows in a zone that satisfy the condition defined for the zone condition tally and a cell count tally that specifies a total number of rows in the zone; or a zone condition tally defined with a fail to satisfy count tally that specifies a number of rows in a zone that fail to satisfy the condition defined for the zone condition tally and a cell count tally that specifies a total number of rows in the zone. The three aforementioned zone condition tallies provide query optimizer 125 two out of the following three pieces of information for a particular zone: a number of rows in a zone that satisfy the condition defined for the zone condition tally, a number of rows in the zone that fail to satisfy the condition defined for the zone condition tally; and a total number of rows in the zone. From any two out of three pieces of information, query optimizer 125 may calculate the third missing piece of information. As such, the three zone condition tallies are functionally equivalent.

FIGS. 2-5 illustrate an exemplary table that is divided into eight zones. One of ordinary skill in the art will understand that a table may be divided into zones in any number of different ways. For example, in some embodiments, complete rows of a table (as opposed to values in a column of the table) can be divided into several zones. Such an approach may be used for row-oriented database tables in some such embodiments. In other embodiments, a combination of the two aforementioned approaches may be used on a table. Furthermore, the cell values of the table columns illustrated in FIGS. 2-5 (e.g., cell values 210 and cell values 310) are shown for purposes of simplicity and explanation. One of ordinary skill in the art will understand that the form in which the cell values are presented does not imply there is a separate data structure for storing the cell values nor does it imply any particular physical organization of the cell values.

Returning to FIG. 1, query execution engine 135 is responsible for execution query plans. For example, query execution engine 135 may receive a query plan for a query from query manager 115. In response, query execution engine 135 executes the query plan in order to generate a result set for the query. In some embodiments query execution engine 135 executes the query plan by accessing data storage 145, evaluating the condition included in the query on the values in zones included in the query plan, and retrieving data for the result set of the query based on the evaluations of the condition of the query. Once query execution engine 135 generates the result set for the query, query execution engine 135 sends the result set to query manager 115.

Zone condition tally manager 130 is configured to create zone condition tallies. For example, when a zone condition tally is defined for a condition on one or more columns of a table, zone condition tally manager 130 generates a mapping between zones in the table and one or more bit tallies specified for the zone condition tally similar to the mappings of the zone condition tallies illustrated in FIGS. 2-5. In some instances, a zone condition tally is defined manually (e.g., via a tool provided by data processing system 110). In other instances, a zone condition tally is defined automatically by data processing system 110 based on analysis of processed queries on columns of tables. Once a zone condition tally is defined, zone condition tally manager 130, for each zone, evaluates the values in the one or more columns for which the zone condition tally is defined and determines the bit tallies specified for the zone condition tally based on the evaluated values. Finally, zone condition tally manager 130 stores the zone condition tally in zone condition tallies storage 140 for later use.

Zone condition tally manager 130 is also responsible for maintaining zone condition tallies stored in zone condition tallies storage 140. In some embodiments, zone condition tally manager 130 performs certain operations for a zone condition tally when a table on which the zone condition tally is defined is modified. For instance, when a new record is added to a table on which a zone condition tally that uses a satisfy bit tally is defined or a record in the table is modified, zone condition tally manager 130 checks if the satisfy bit is set for the zone to which the record belongs. If the satisfy bit is set, zone condition tally manager 130 does not do anything. If the satisfy bit is not set, zone condition tally manager 130 sets the satisfy bit if the values in the new record or modified record satisfy the mapped condition specified for the zone condition tally. When a record is deleted from a table on which a zone condition tally that uses a satisfy bit tally is defined, zone condition tally manager 130 does nothing in some embodiments. In other embodiments, if the satisfy bit of the zone to which the deleted record belonged is set, zone condition tally manager 130 may evaluate the values of the remaining records in the zone and set the satisfy bit to off if none of the values of the remaining records satisfy the mapped condition specified for the zone condition tally.

As another example, when a new record is added to a table on which a zone condition tally that uses a fail-to-satisfy bit is defined or a record in the table is modified, zone condition tally manager 130 checks if the fail-to-satisfy bit is set for the zone to which the record belongs. If the fail-to-satisfy bit is set, zone condition tally manager 130 does not do anything. If the fail-to-satisfy bit is not set, zone condition tally manager 130 sets the fail-to-satisfy bit if the values in the new record or modified record do not satisfy the mapped condition specified for the zone condition tally. When a record is deleted from a table on which a zone condition tally that uses a fail-to-satisfy bit tally is defined, zone condition tally manager 130 does nothing in some embodiments. In other embodiments, if the fail-to-satisfy bit of the zone to which the deleted record belonged is set, zone condition tally manager 130 may evaluate the values of the remaining records in the zone and set the fail-to-satisfy bit to off if all of the values of the remaining records satisfy the mapped condition specified for the zone condition tally.

In some embodiments, the costs for maintaining bit tallies where false positives are allowed are never worse than being linear with the number of cell values inserted or modified. The costs may be significantly sub-linear for many data patterns. A zone condition tally may use bit tallies when cell values of a table on which the zone condition tally is defined are never or rarely modified after they have been inserted, deletes are done as bulk operations, the mapped condition of a zone condition tally is highly selective, and/or the result of the mapped condition specified for the zone condition tally is highly correlated with time of insertion. An advantage of using bit tallies is that they consume very little space per zone and are very efficient to maintain.

Zone condition tally manager 130 may perform certain operations for a zone condition tally that uses count tallies when a table on which the zone condition tally is defined is modified. For example, when a new record is added to a table on which a zone condition tally that uses a satisfy count tally and a cell count tally (e.g., zone condition tally 505) is defined, zone condition tally manager 130 increments the satisfy count tally for the zone to which the new record belongs if the values in the new record satisfy the mapped condition specified for the zone condition tally. In instances where a record is deleted from a table on which a zone condition tally that uses a satisfy count tally and a cell count tally (e.g., zone condition tally 505) is defined, zone condition tally manager 130 decrements the satisfy count tally for the zone to which the deleted record belonged if the values in the deleted record satisfied the mapped condition specified for the zone condition tally. When values are replaced for a record in a table on which a zone condition tally that uses a satisfy count tally and a cell count tally (e.g., zone condition tally 505) is defined, zone condition tally manager 130 decrements the satisfy count tally for the zone to which the deleted record belonged if the replaced values in the record satisfy the mapped condition specified for the zone condition tally and increments the satisfy count tally for the zone if the new values in the record satisfy the mapped condition specified for the zone condition tally.

For zone condition tallies that use count tallies, an advantage at maintenance time is that the cost of updating the count tally is directly linear with the number of cells being added, modified, or deleted. As such, a zone condition tally that use count tallies can be used where the cell values on which the zone condition tally is defined are modified often after they have been inserted and/or the result of the mapped condition specified for the zone condition tally is highly correlated with time of insertion.

Figure 6:
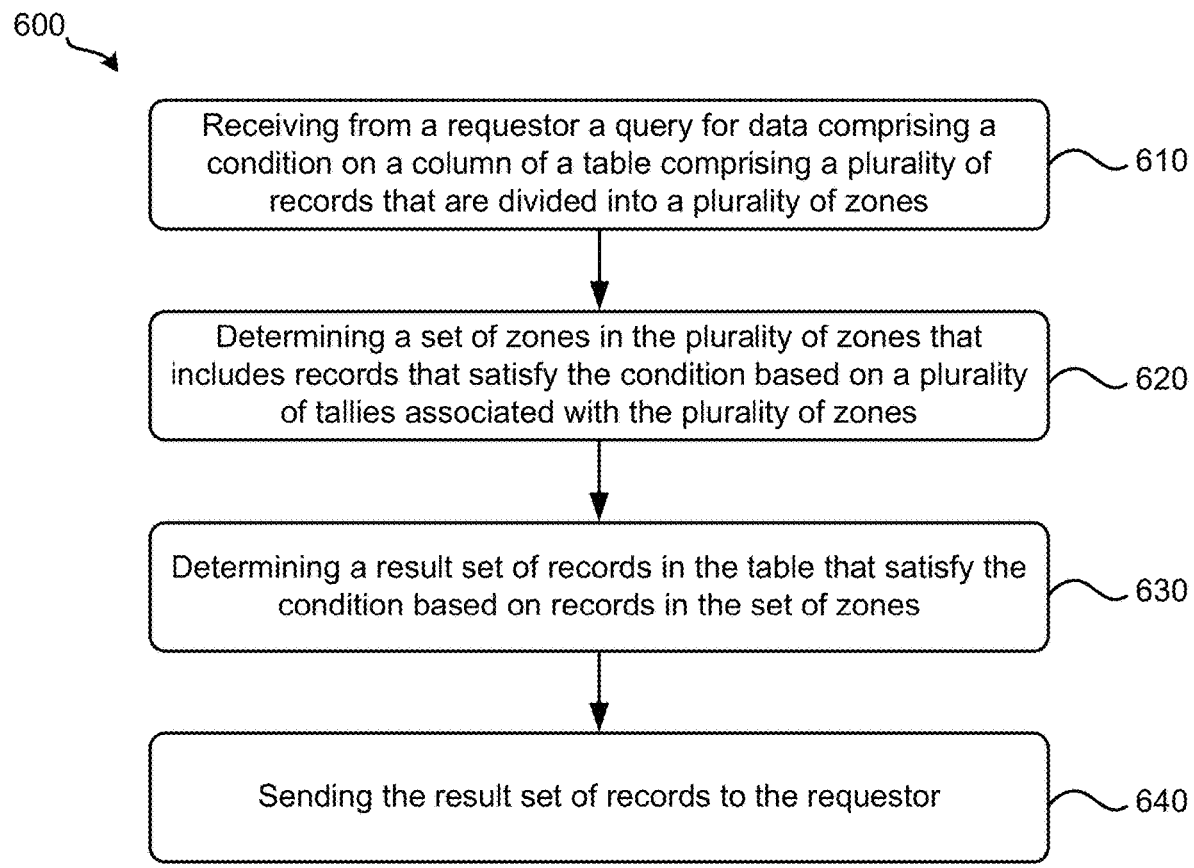
FIG. 6 illustrates a process for processing queries according to some embodiments.

FIG. 6 illustrates a process 600 for processing queries according to some embodiments. In some embodiments, data processing system 110 performs process 600. Process 600 starts by receiving, at 610, from a requestor (e.g., an application or a user) a query for data comprising a condition on a column of a table comprising a plurality of records that are divided into a plurality of zones. Referring to FIGS. 1 and 2 as an example, query manager 115 may receive from an application 105 a query for data comprising a condition in which the month number of a date value stored in column BUY_DATE of table 200, which is divided into Zones 1-8, is equal to 9 (e.g., MONTH(T.BUY_DATE)=9).

Next, process 600 determines, at 620, a set of zones in a plurality of zones that include records that satisfy the condition based on a plurality of tallies associated with the plurality of zones. Each tally in the plurality of tallies may be for indicating whether a zone in the plurality of zones include records with data values in the column of the table that satisfy the condition. In some embodiments, process 600 includes a zone in the set of zones when process 600 determines the zone includes records that have values that satisfy the condition of the query based on a zone condition tally defined for the condition. Further, process 600 excludes a zone from the set of zones when process 600 determines that the zones does not include any records that have values that satisfy the condition of the query based on the zone condition tally defined for the condition. Continuing with the example above, query optimizer 125 may determine the set of zones based on zone condition tally 205. In this example, query optimizer 125 includes Zones 2-4 in the set of zones since the satisfy bit tallies for these zones are set (i.e., the value of the satisfy bit is 1). In addition, query optimizer 125 excludes Zones 1 and 5-8 from the query plan for the query because the satisfy bit tallies for these zones are not set (i.e., the value of the satisfy bit is 0). Query optimizer 125 then includes the set of zones in a query plan for the query and excludes zones from the query plan for the query that are not included in the set of zones.

Process 600 then determines, at 630, a result set of records in the table that satisfy the condition based on the records in the set of zones. Referring to FIGS. 1 and 2 to continue the example above, query execution engine 125 determines a result set of records in the table that satisfy the condition of the query based on the set of zones by executing the query plan for the query, which, as explained above, includes Zones 2-4 and 6-8 and excludes Zones 1 and 5. Query execution engine 125 may execute the query plan by accessing data storage 145, evaluating the condition included in the query on the values in zones included in the query plan, and performing any further processing on the data in order to determine the result set of the query. Finally, process 600 sends, at 640, the result set of records to the requestor.

Figure 7:
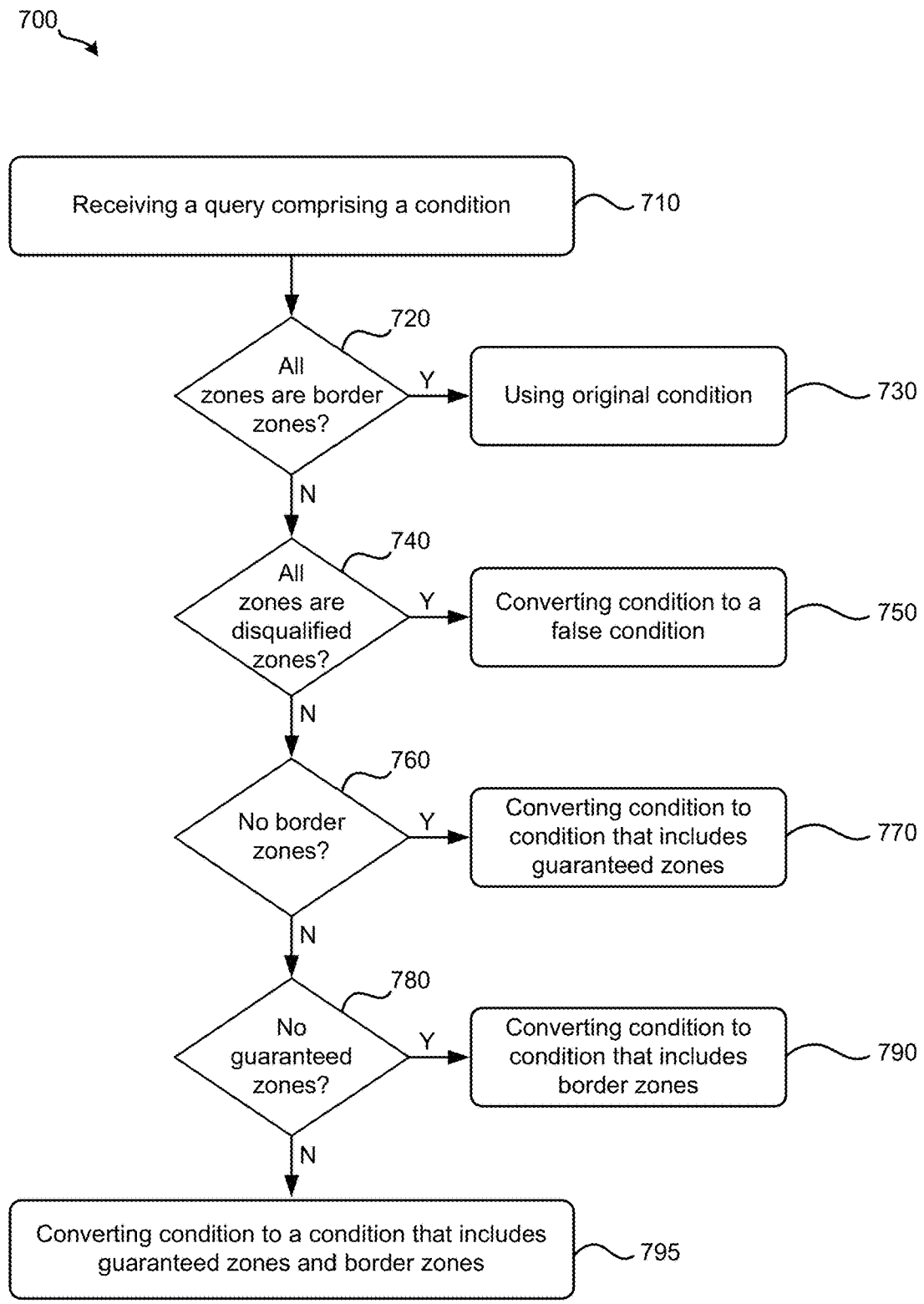
FIG. 7 illustrates a process for rewriting and simplifying conditions of queries according to some embodiments.

In some embodiments, the limiting of a query plan to a specific set of zones is encapsulated as a condition of a form like: ZONE_ID(T.X) IN (<list-of zone ids>), thereby enabling a condition of the query to be rewritten as a ZONE_ID prefilter condition based on the qualified zones AND'ed to the condition of the query. In some instances, each qualified zone may be further identified as either a guaranteed zone or a border zone. FIG. 7 illustrates a process 700 for rewriting and simplifying conditions of queries according to some embodiments. In particular, process 700 is performed in instances where zone limitations are expressed as a ZONE_ID condition and where guaranteed and border zones have been identified. In some embodiments, data processing system 110 performs process 700 as part of operation 610. Process 700 begins by receiving, at 710, a query comprising a condition. Referring to FIG. 1 as an example, query optimizer 125 may receive the (parsed) query comprising the condition from query manager 115. In this example, query optimizer 125 deduces that a zone condition tally (e.g., zone condition tally 405, zone condition tally 505, etc.) can be used for this condition and further identifies the qualified guaranteed zones, the qualified border zones, and the disqualified zones based on the zone condition tally. In some embodiments, the condition of the query is replaced with the following compound condition: ZONE_ID (T.X) IN (<guaranteed-zones>) OR (ZONE_ID (T.X) IN (<border-zones>) AND <received-condition>)).

Next, process 700 determines, at 720 whether all the zones are border zones. If so, process 700 uses, at 730, the original condition of the query. Otherwise process determines, at 740, whether all the zones are disqualified zones. If so, process 700 converts, at 750, the condition of the query to a false condition (e.g., 0=1). Otherwise, process 700 determines, at 760, whether there are no border zones. If so, process 700 converts, at 770, the condition of the query to a condition that includes the guaranteed zones (e.g., ZONE_ID (T.X) IN (<guaranteed zones>). Otherwise, process determines, at 780, whether there are no guaranteed zones. If so, process 700 converts, at 790, the condition of the query to a condition that includes the border zones (e.g., ZONE_ID (T.X) IN (<border zones>) AND MOD (T.X, 5)=0). Otherwise, process converts, at 795, the condition of the query to the default compound condition that includes the guaranteed zones and the border zones and that evaluates the condition of the query for the rows in the border zones (e.g., ZONE_ID (T.X) IN (<guaranteed zones>) OR (ZONE_ID (T.X) IN (<border zones>) AND MOD (T.X, 5)=0)).

Figure 8:
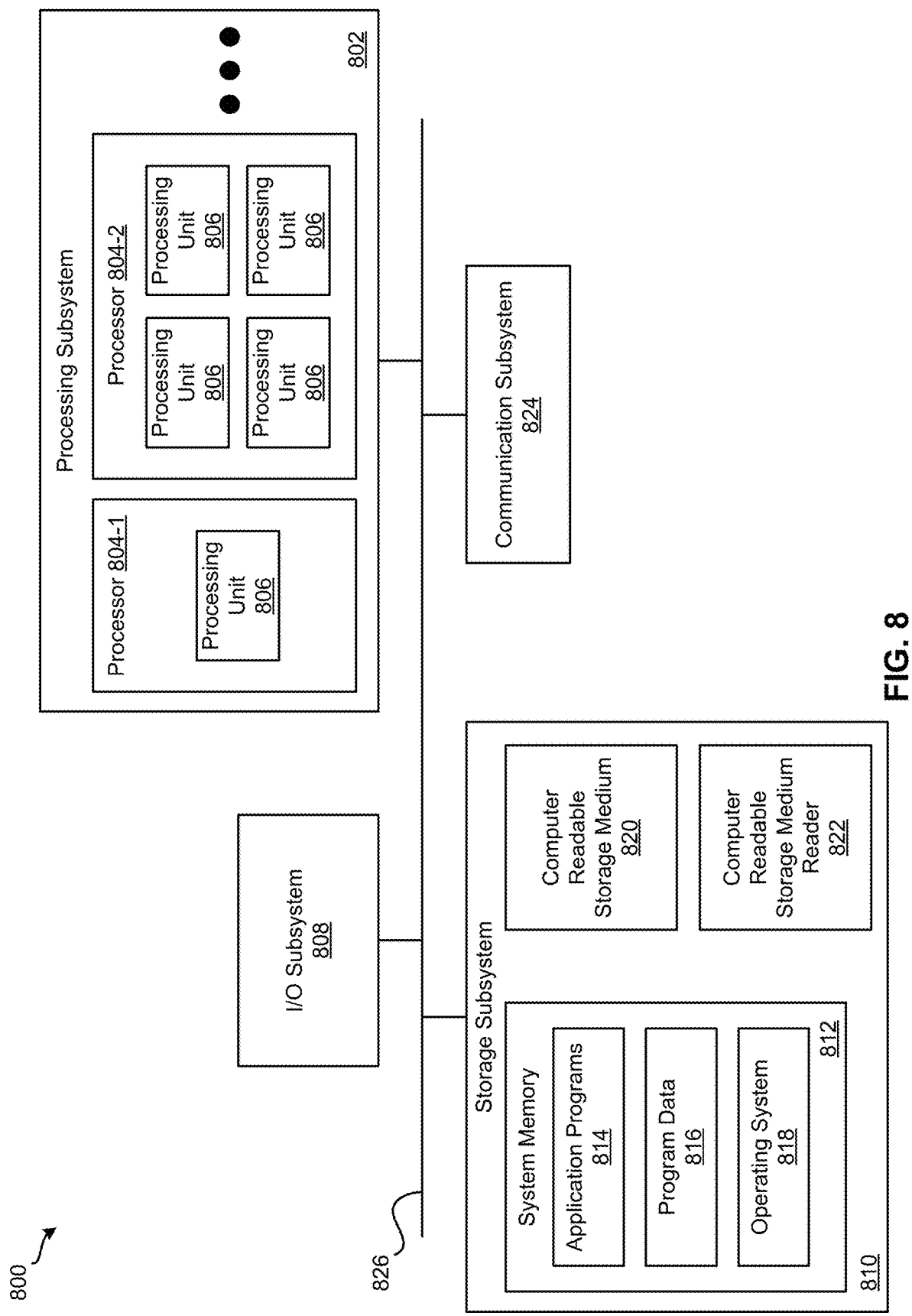
FIG. 8 illustrates an exemplary computer system, in which various embodiments may be implemented.

FIG. 8 illustrates an exemplary computer system 800 for implementing various embodiments described above. For example, computer system 800 may be used to implement data processing system 110. Computer system 800 may be a desktop computer, a laptop, a server computer, or any other type of computer system or combination thereof. Some or all elements of applications 105a-n, query manager 115, query parser 120, query optimizer 125, zone condition tally manager 130, query execution engine 135, or combinations thereof can be included or implemented in computer system 800. In addition, computer system 800 can implement many of the operations, methods, and/or processes described above (e.g., processes 600 and 700). As shown in FIG. 8, computer system 800 includes processing subsystem 802, which communicates, via bus subsystem 826, with input/output (I/O) subsystem 808, storage subsystem 810 and communication subsystem 824.

Bus subsystem 826 is configured to facilitate communication among the various components and subsystems of computer system 800. While bus subsystem 826 is illustrated in FIG. 8 as a single bus, one of ordinary skill in the art will understand that bus subsystem 826 may be implemented as multiple buses. Bus subsystem 826 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 802, which can be implemented as one or more integrated circuits (e.g., a conventional microprocessor or microcontroller), controls the operation of computer system 800. Processing subsystem 802 may include one or more processors 804. Each processor 804 may include one processing unit 806 (e.g., a single core processor such as processor 804-1) or several processing units 806 (e.g., a multicore processor such as processor 804-2). In some embodiments, processors 804 of processing subsystem 802 may be implemented as independent processors while, in other embodiments, processors 804 of processing subsystem 802 may be implemented as multiple processors integrate into a single chip or multiple chips. Still, in some embodiments, processors 804 of processing subsystem 802 may be implemented as a combination of independent processors and multiple processors integrated into a single chip or multiple chips.

In some embodiments, processing subsystem 802 can execute a variety of programs or processes in response to program code and can maintain multiple concurrently executing programs or processes. At any given time, some or all of the program code to be executed can reside in processing subsystem 802 and/or in storage subsystem 810. Through suitable programming, processing subsystem 802 can provide various functionalities, such as the functionalities described above by reference to process 600, process 700, etc.

I/O subsystem 808 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 800 to a user or another device (e.g., a printer).

As illustrated in FIG. 8, storage subsystem 810 includes system memory 812, computer-readable storage medium 820, and computer-readable storage medium reader 822. System memory 812 may be configured to store software in the form of program instructions that are loadable and executable by processing subsystem 802 as well as data generated during the execution of program instructions. In some embodiments, system memory 812 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 812 may include different types of memory, such as static random access memory (SRAM) and/or dynamic random access memory (DRAM). System memory 812 may include a basic input/output system (BIOS), in some embodiments, that is configured to store basic routines to facilitate transferring information between elements within computer system 800 (e.g., during start-up). Such a BIOS may be stored in ROM (e.g., a ROM chip), flash memory, or any other type of memory that may be configured to store the BIOS.

As shown in FIG. 8, system memory 812 includes application programs 814 (e.g., application 105*a-n*), program data 816, and operating system (OS) 818. OS 818 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 820 may be a non-transitory computer-readable medium configured to store software (e.g., programs, code modules, data constructs, instructions, etc.). Many of the components (e.g., applications 105*a-n*, query manager 115, query parser 120, query optimizer 125, zone condition tally manager 130, and query execution engine 135) and/or processes (e.g., processes 600 and 700) described above may be implemented as software that when executed by a processor or processing unit (e.g., a processor or processing unit of processing subsystem 802) performs the operations of such components and/or processes. Storage subsystem 810 may also store data used for, or generated during, the execution of the software.

Storage subsystem 810 may also include computer-readable storage medium reader 822 that is configured to communicate with computer-readable storage medium 820. Together and, optionally, in combination with system memory 812, computer-readable storage medium 820 may comprehensively represent remote, local, fixed, and/or removable storage devices plus storage media for temporarily and/or more permanently containing, storing, transmitting, and retrieving computer-readable information.

Computer-readable storage medium 820 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 824 serves as an interface for receiving data from, and transmitting data to, other devices, computer systems, and networks. For example, communication subsystem 824 may allow computer system 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 824 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 824 may provide components configured for wired communication (e.g., Ethernet) in addition to or instead of components configured for wireless communication.

One of ordinary skill in the art will realize that the architecture shown in FIG. 8 is only an example architecture of computer system 800, and that computer system 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
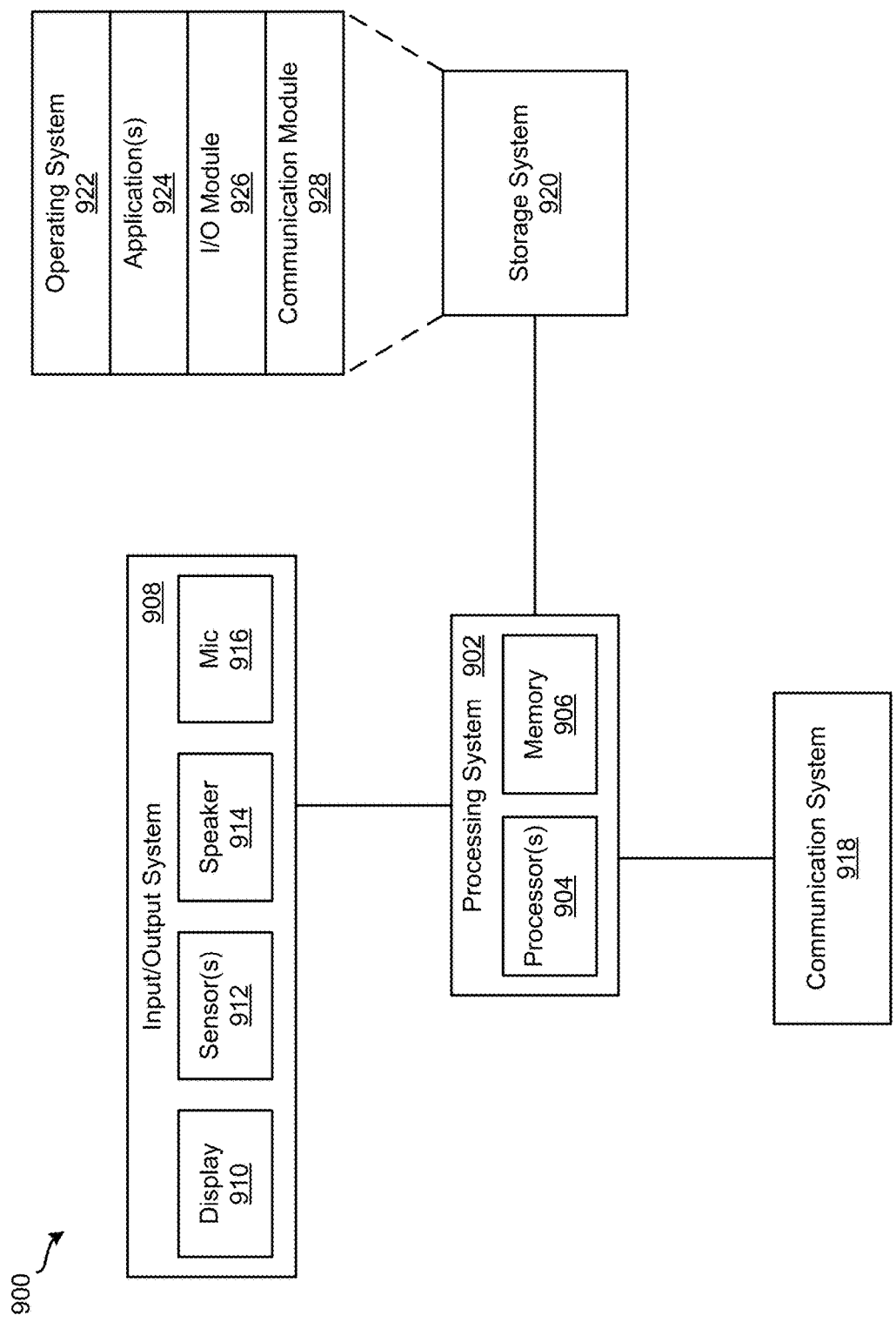
FIG. 9 illustrates an exemplary computing device, in which various embodiments may be implemented.

FIG. 9 illustrates an exemplary computing device 900 for implementing various embodiments described above. Computing device 900 may be a cellphone, a smartphone, a wearable device, an activity tracker or manager, a tablet, a personal digital assistant (PDA), a media player, or any other type of mobile computing device or combination thereof. Applications 105*a-n* can be included or implemented in computing device 900. As shown in FIG. 9, computing device 900 includes processing system 902, input/output (I/O) system 908, communication system 918, and storage system 920. These components may be coupled by one or more communication buses or signal lines.

Processing system 902, which can be implemented as one or more integrated circuits (e.g., a conventional microprocessor or microcontroller), controls the operation of computing device 900. As shown, processing system 902 includes one or more processors 904 and memory 906. Processors 904 are configured to run or execute various software and/or sets of instructions stored in memory 906 to perform various functions for computing device 900 and to process data.

Each processor of processors 904 may include one processing unit (e.g., a single core processor) or several processing units (e.g., a multicore processor). In some embodiments, processors 904 of processing system 902 may be implemented as independent processors while, in other embodiments, processors 904 of processing system 902 may be implemented as multiple processors integrate into a single chip. Still, in some embodiments, processors 904 of processing system 902 may be implemented as a combination of independent processors and multiple processors integrated into a single chip.

Memory 906 may be configured to receive and store software (e.g., operating system 922, applications 924, I/O module 926, communication module 928, etc. from storage system 920) in the form of program instructions that are loadable and executable by processors 904 as well as data generated during the execution of program instructions. In some embodiments, memory 906 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 908 is responsible for receiving input through various components and providing output through various components. As shown for this example, I/O system 908 includes display 910, one or more sensors 912, speaker 914, and microphone 916. Display 910 is configured to output visual information (e.g., a graphical user interface (GUI) generated and/or rendered by processors 904). In some embodiments, display 910 is a touch screen that is configured to also receive touch-based input. Display 910 may be implemented using liquid crystal display (LCD) technology, light-emitting diode (LED) technology, organic LED (OLED) technology, organic electro luminescence (OEL) technology, or any other type of display technologies. Sensors 912 may include any number of different types of sensors for measuring a physical quantity (e.g., temperature, force, pressure, acceleration, orientation, light, radiation, etc.). Speaker 914 is configured to output audio information and microphone 916 is configured to receive audio input. One of ordinary skill in the art will appreciate that I/O system 908 may include any number of additional, fewer, and/or different components. For instance, I/O system 908 may include a keypad or keyboard for receiving input, a port for transmitting data, receiving data and/or power, and/or communicating with another device or component, an image capture component for capturing photos and/or videos, etc.

Communication system 918 serves as an interface for receiving data from, and transmitting data to, other devices, computer systems, and networks. For example, communication system 918 may allow computing device 900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 918 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 918 may provide components configured for wired communication (e.g., Ethernet) in addition to or instead of components configured for wireless communication.

Storage system 920 handles the storage and management of data for computing device 900. Storage system 920 may be implemented by one or more non-transitory machine-readable mediums that are configured to store software (e.g., programs, code modules, data constructs, instructions, etc.) and store data used for, or generated during, the execution of the software. Many of the components (e.g., applications 105*a-n*) described above may be implemented as software that when executed by a processor or processing unit (e.g., processors 904 of processing system 902) performs the operations of such components and/or processes.

In this example, storage system 920 includes operating system 922, one or more applications 924, I/O module 926, and communication module 928. Operating system 922 includes various procedures, sets of instructions, software components and/or drivers for controlling and managing general system tasks (e.g., memory management, storage device control, power management, etc.) and facilitates communication between various hardware and software components. Operating system 922 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 924 can include any number of different applications installed on computing device 900. For example, an application 105 may be installed on computing device 900. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 926 manages information received via input components (e.g., display 910, sensors 912, and microphone 916) and information to be outputted via output components (e.g., display 910 and speaker 914). Communication module 928 facilitates communication with other devices via communication system 918 and includes various software components for handling data received from communication system 918.

One of ordinary skill in the art will realize that the architecture shown in FIG. 9 is only an example architecture of computing device 900, and that computing device 900 may have additional or fewer components than shown, or a different configuration of components. The various components shown in FIG. 9 may be implemented in hardware, software, firmware or any combination thereof, including one or more signal processing and/or application specific integrated circuits.

Figure 10:
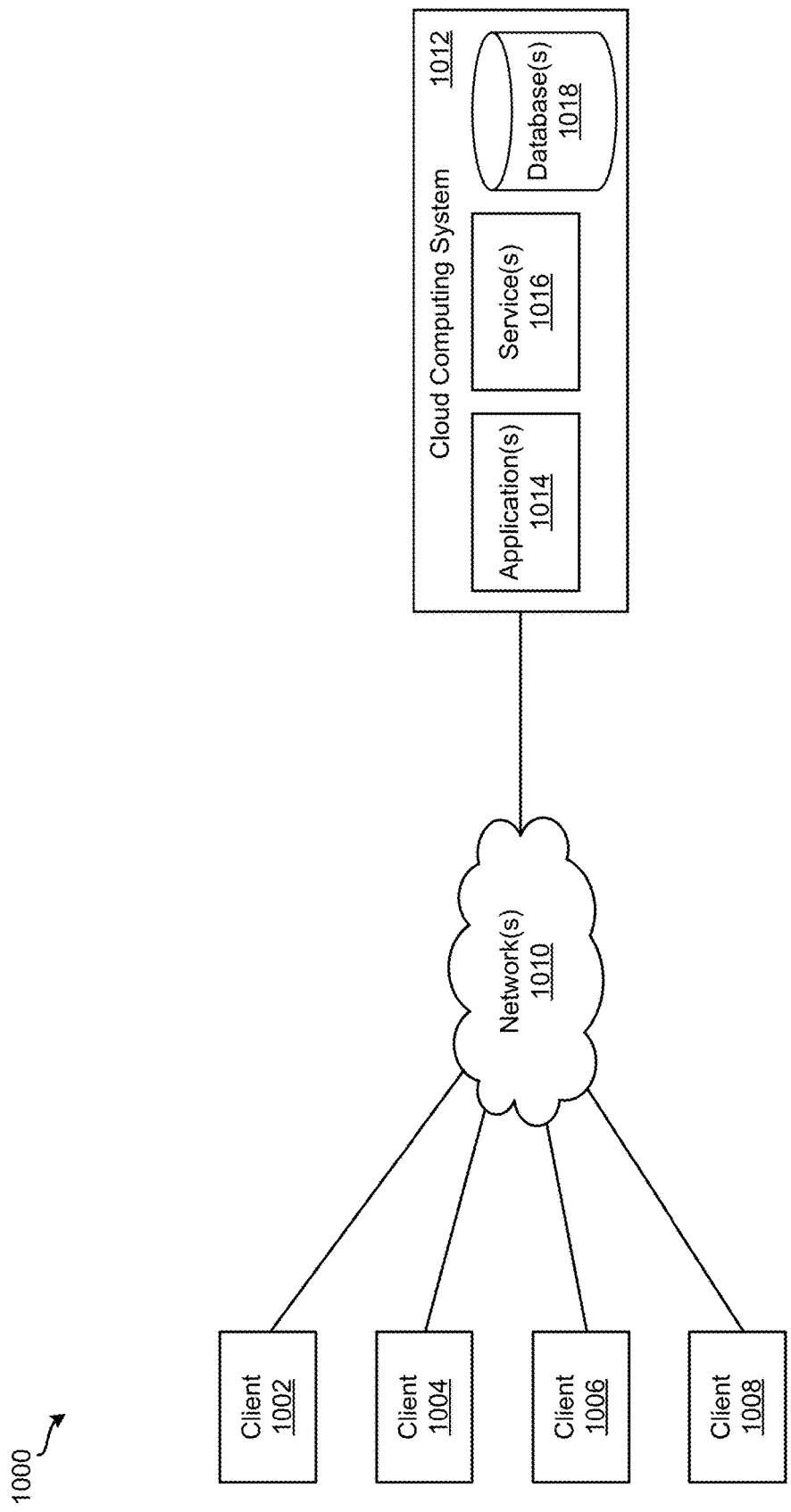
FIG. 10 illustrates system for implementing various embodiments described above.

FIG. 10 illustrates an exemplary system 1000 for implementing various embodiments described above. For example, cloud computing system 1012 of system 1000 may be used to implement data processing system 110. As shown, system 1000 includes client devices 1002-1008, one or more networks 1010, and cloud computing system 1012. Cloud computing system 1012 is configured to provide resources and data to client devices 1002-1008 via networks 1010. In some embodiments, cloud computing system 1000 provides resources to any number of different users (e.g., customers, tenants, organizations, etc.). Cloud computing system 1012 may be implemented by one or more computer systems (e.g., servers), virtual machines operating on a computer system, or a combination thereof.

As shown, cloud computing system 1012 includes one or more applications 1014, one or more services 1016, and one or more databases 1018. Cloud computing system 1000 may provide applications 1014, services 1016, and databases 1018 to any number of different customers in a self-service, subscription-based, elastically scalable, reliable, highly available, and secure manner.

In some embodiments, cloud computing system 1000 may be adapted to automatically provision, manage, and track a customer's subscriptions to services offered by cloud computing system 1000. Cloud computing system 1000 may provide cloud services via different deployment models. For example, cloud services may be provided under a public cloud model in which cloud computing system 1000 is owned by an organization selling cloud services and the cloud services are made available to the general public or different industry enterprises. As another example, cloud services may be provided under a private cloud model in which cloud computing system 1000 is operated solely for a single organization and may provide cloud services for one or more entities within the organization. The cloud services may also be provided under a community cloud model in which cloud computing system 1000 and the cloud services provided by cloud computing system 1000 are shared by several organizations in a related community. The cloud services may also be provided under a hybrid cloud model, which is a combination of two or more of the aforementioned different models.

In some instances, any one of applications 1014, services 1016, and databases 1018 made available to client devices 1002-1008 via networks 1010 from cloud computing system 1000 is referred to as a "cloud service." Typically, servers and systems that make up cloud computing system 1000 are different from the on-premises servers and systems of a customer. For example, cloud computing system 1000 may host an application and a user of one of client devices 1002-1008 may order and use the application via networks 1010.

Applications 1014 may include software applications that are configured to execute on cloud computing system 1012 (e.g., a computer system or a virtual machine operating on a computer system) and be accessed, controlled, managed, etc. via client devices 1002-1008. In some embodiments, applications 1014 may include server applications and/or mid-tier applications (e.g., HTTP (hypertext transport protocol) server applications, FTP (file transfer protocol) server applications, CGI (common gateway interface) server applications, JAVA server applications, etc.). Services 1016 are software components, modules, application, etc. that are configured to execute on cloud computing system 1012 and provide functionalities to client devices 1002-1008 via networks 1010. Services 1016 may be web-based services or on-demand cloud services.

Databases 1018 are configured to store and/or manage data that is accessed by applications 1014, services 1016, and/or client devices 1002-1008. For instance, storages 140 and 145 may be stored in databases 1018. Databases 1018 may reside on a non-transitory storage medium local to (and/or resident in) cloud computing system 1012, in a storage-area network (SAN), on a non-transitory storage medium local located remotely from cloud computing system 1012. In some embodiments, databases 1018 may include relational databases that are managed by a relational database management system (RDBMS). Databases 1018 may be a column-oriented databases, row-oriented databases, or a combination thereof. In some embodiments, some or all of databases 1018 are in-memory databases. That is, in some such embodiments, data for databases 1018 are stored and managed in memory (e.g., random access memory (RAM)).

Client devices 1002-1008 are configured to execute and operate a client application (e.g., a web browser, a proprietary client application, etc.) that communicates with applications 1014, services 1016, and/or databases 1018 via networks 1010. This way, client devices 1002-1008 may access the various functionalities provided by applications 1014, services 1016, and databases 1018 while applications 1014, services 1016, and databases 1018 are operating (e.g., hosted) on cloud computing system 1000. Client devices 1002-1008 may be computer system 800 or computing device 900, as described above by reference to FIGS. 8 and 9, respectively. Although system 1000 is shown with four client devices, any number of client devices may be supported.

Networks 1010 may be any type of network configured to facilitate data communications among client devices 1002-1008 and cloud computing system 1012 using any of a variety of network protocols. Networks 1010 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   receiving, from a requestor, a query for data comprising a condition on a column of a table, the table comprising a plurality of records divided into a plurality of zones, at least one zone in the plurality of zones including two or more records in the plurality of records;
   determining a set of zones in the plurality of zones that include records that satisfy the condition based on a plurality of tallies associated with the plurality of zones, each tally in the plurality of tallies for indicating whether a zone in the plurality of zones include records with data values in the column of the table that satisfy the condition, wherein the plurality of tallies associated with the plurality of zones are determined prior to receiving the query;
   determining a result set of records in the table that satisfy the condition based on records in the set of zones; and
   sending the result set of records to the requestor.

2. The non-transitory machine-readable medium of claim 1, wherein the plurality of tallies is a first plurality of tallies, wherein determining the set of zones in the plurality of zones that include records that satisfy the condition is further based on a second plurality of tallies associated with the plurality of zones, each tally in the second plurality of tallies for indicating whether any of the records in a zone in the plurality of zones include records with data values in the column of the table that fail to satisfy the condition.

3. The non-transitory machine-readable medium of claim 1, wherein the plurality of tallies is a plurality of bit tallies.

4. The non-transitory machine-readable medium of claim 3, wherein the plurality of bit tallies is a first plurality of bit tallies, wherein determining the set of zones in the plurality of zones that include records that satisfy the condition is further based on a second plurality of bit tallies associated with the plurality of zones, each bit tally in the second plurality of bit tallies for indicating whether any of the records in a zone in the plurality of zones have data values in the column of the table that fail to satisfy the condition.

5. The non-transitory machine-readable medium of claim 1, wherein the plurality of tallies is a plurality of count tallies.

6. The non-transitory machine-readable medium of claim 5, wherein the plurality of count tallies is a first plurality of count tallies, wherein determining the set of zones in the plurality of zones that include records that satisfy the condition is further based on a second plurality of count tallies associated with the plurality of zones, each count tally in the second plurality of count tallies for indicating a number of records in a zone in the plurality of zones that fail to satisfy the condition.

7. The non-transitory machine-readable medium of claim 5, wherein the plurality of count tallies is a first plurality of count tallies, wherein determining the set of zones in the plurality of zones that include records that satisfy the condition is further based on a second plurality of count tallies associated with the plurality of zones, each count tally in the second plurality of count tallies for indicating a total number of records in a zone in the plurality of zones.

8. A method comprising:
receiving, from a requestor, a query for data comprising a condition on a column of a table, the table comprising a plurality of records divided into a plurality of zones, at least one zone in the plurality of zones including two or more records in the plurality of records;
determining a set of zones in the plurality of zones that include records that satisfy the condition based on a plurality of tallies associated with the plurality of zones, each tally in the plurality of tallies for indicating whether a zone in the plurality of zones include records with data values in the column of the table that satisfy the condition, wherein the plurality of tallies associated with the plurality of zone are determined prior to receiving the query;
determining a result set of records in the table that satisfy the condition based on records in the set of zones; and
sending the result set of records to the requestor.

9. The method of claim 8, wherein the plurality of tallies is a first plurality of tallies, wherein determining the set of zones in the plurality of zones that include records that satisfy the condition is further based on a second plurality of tallies associated with the plurality of zones, each tally in the second plurality of tallies for indicating whether any of the records in a zone in the plurality of zones include records with data values in the column of the table that fail to satisfy the condition.

10. The method of claim 8, wherein the plurality of tallies is a plurality of bit tallies.

11. The method of claim 10, wherein the plurality of bit tallies is a first plurality of bit tallies, wherein determining the set of zones in the plurality of zones that include records that satisfy the condition is further based on a second plurality of bit tallies associated with the plurality of zones, each bit tally in the second plurality of bit tallies for indicating whether any of the records in a zone in the plurality of zones have data values in the column of the table that fail to satisfy the condition.

12. The method of claim 8, wherein the plurality of tallies is a plurality of count tallies.

13. The method of claim 12, wherein the plurality of count tallies is a first plurality of count tallies, wherein determining the set of zones in the plurality of zones that include records that satisfy the condition is further based on a second plurality of count tallies associated with the plurality of zones, each count tally in the second plurality of count tallies for indicating a number of records in a zone in the plurality of zones that fail to satisfy the condition.

14. The method of claim 12, wherein the plurality of count tallies is a first plurality of count tallies, wherein determining the set of zones in the plurality of zones that include records that satisfy the condition is further based on a second plurality of count tallies associated with the plurality of zones, each count tally in the second plurality of count tallies for indicating a total number of records in a zone in the plurality of zones.

15. A system comprising:
a set of processing units; and
a non-transitory computer-readable medium storing instructions that when executed by at least one processing unit in the set of processing units cause the at least one processing unit to:
receive, from a requestor, a query for data comprising a condition on a column of a table, the table comprising a plurality of records divided into a plurality of zones, at least one zone in the plurality of zones including two or more records in the plurality of records;
determine a set of zones in the plurality of zones that include records that satisfy the condition based on a plurality of tallies associated with the plurality of zones, each tally in the plurality of tallies for indicating whether a zone in the plurality of zones include records with data values in the column of the table that satisfy the condition, wherein the plurality of tallies associated with the plurality of zones are determined prior to receiving the query;
determine a result set of records in the table that satisfy the condition based on records in the set of zones; and
send the result set of records to the requestor.

16. The system of claim 15, wherein the plurality of tallies is a first plurality of tallies, wherein determining the set of zones in the plurality of zones that include records that satisfy the condition is further based on a second plurality of tallies associated with the plurality of zones, each tally in the second plurality of tallies for indicating whether any of the records in a zone in the plurality of zones include records with data values in the column of the table that fail to satisfy the condition.

17. The system of claim 15, wherein the plurality of tallies is a plurality of bit tallies.

18. The system of claim 17, wherein the plurality of bit tallies is a first plurality of bit tallies, wherein determining the set of zones in the plurality of zones that include records that satisfy the condition is further based on a second plurality of bit tallies associated with the plurality of zones, each bit tally in the second plurality of bit tallies for indicating whether any of the records in a zone in the plurality of zones have data values in the column of the table that fail to satisfy the condition.

19. The system of claim 15, wherein the plurality of tallies is a plurality of count tallies.

20. The system of claim 19, wherein the plurality of count tallies is a first plurality of count tallies, wherein determining the set of zones in the plurality of zones that include records that satisfy the condition is further based on a second plurality of count tallies associated with the plurality of zones, each count tally in the second plurality of count tallies for indicating a number of records in a zone in the plurality of zones that fail to satisfy the condition.

* * * * *